(12) United States Patent
Wilkins et al.

(10) Patent No.: US 6,920,738 B2
(45) Date of Patent: Jul. 26, 2005

(54) PUSH/PULL CLIP FEED CONFIGURATION FOR SELECTIVELY DELIVERING OR WITHDRAWING A CLIP TO ALLOW OUTPUT OF ONE CLIP ALONE OR TWO CLIPS CONCURRENTLY AND ASSOCIATED DEVICES, METHODS, SYSTEMS AND COMPUTER PROGRAM PRODUCTS

(75) Inventors: Bryan E. Wilkins, Apex, NC (US); W. Mark Poteat, Fuquay-Varina, NC (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/822,408

(22) Filed: Apr. 12, 2004

(65) Prior Publication Data

US 2004/0172916 A1 Sep. 9, 2004

Related U.S. Application Data

(60) Provisional application No. 60/470,327, filed on May 14, 2003.

(51) Int. Cl.$^7$ .............................................. B65B 51/00
(52) U.S. Cl. .......................... 53/417; 53/419; 53/138.2
(58) Field of Search ....................... 53/417, 419, 138.2, 53/138.4, 138.3; 29/243.57

(56) References Cited

U.S. PATENT DOCUMENTS

| | | | | |
|---|---|---|---|---|
| 3,543,378 A | | 12/1970 | Klenz ....................... | 29/243.57 |
| 3,583,056 A | * | 6/1971 | Klenz ....................... | 29/243.57 |
| 4,004,339 A | * | 1/1977 | Velarde .................... | 29/243.56 |
| 4,571,805 A | * | 2/1986 | Niedecker ................ | 29/243.56 |
| 4,708,261 A | * | 11/1987 | Sinocchi ................... | 221/289 |
| 5,067,313 A | | 11/1991 | Evans ........................ | 53/576 |
| 5,077,955 A | * | 1/1992 | Evans ....................... | 53/138.4 |
| 5,109,648 A | * | 5/1992 | Evans ....................... | 53/134.1 |
| 5,167,567 A | | 12/1992 | Evans ....................... | 452/37 |
| 5,181,302 A | | 1/1993 | Evans ...................... | 29/243.56 |
| 5,495,701 A | | 3/1996 | Poteat et al. ............... | 53/138.2 |
| 5,586,424 A | | 12/1996 | Chen et al. ................ | 53/138.2 |

OTHER PUBLICATIONS

Kern, Josef, "Casing stuffing and clipping system enhances product quality while reducing costs" *Sonderdruck aus, Fleischwirtschaft International*, 2 sheets, (May 1998).
Brochure, "The Tipper Double Clipper", 2 sheets, Mar. 1995.
Brochure, "Voiding/Clipping Machine SV4600, SV4610", 4 sheets, Sep. 1999.
Brochure, "Doppel Clipper Double Clipper No. 32", 6 sheets, May 2001.
Brochure, "Produktinfo Range of Machines", 4 sheets, date product first offered unknown but for examination purposes is stated to be before the earliest claimed priority date.
Brochure, "RS4203", 2 sheets, date product first offered unknown but for examination purposes is stated to be before the earliest claimed priority date.
Brochure, "RS4202M Can Do It All", 2 sheets, © 1998.
Brochure, "The SAM III E Makes Great Dry Sausage And That's Not All!", 2 sheets, © 1997.

* cited by examiner

*Primary Examiner*—Sameh H. Tawfik
(74) *Attorney, Agent, or Firm*—Myers Bigel Sibley & Sajovec PA

(57) ABSTRACT

Methods and apparatus for supplying a clip to a clip window associated with a closure attachment mechanism having a closure punch path for attaching a single clip or two clips to a target tubular work piece in a closure zone include: (a) forcing a plurality of clips to travel in a first predetermined clip travel path having a forward direction toward a first punch path in a closure zone at a first point in time; (b) selectively retracting the plurality of clips so that the clips travel in a reverse direction along the first predetermined clip travel path; and then (c) forcing the plurality of clips to again travel in the forward direction along the first predetermined clip travel path at a second point in time.

30 Claims, 14 Drawing Sheets

PUSH/PULL CLIP FEED CONFIGURATION FOR SELECTIVELY DELIVERING OR WITHDRAWING A CLIP TO ALLOW OUTPUT OF ONE CLIP ALONE OR TWO CLIPS CONCURRENTLY AND ASSOCIATED DEVICES, METHODS, SYSTEMS AND COMPUTER PROGRAM PRODUCTS

RELATED APPLICATIONS

This application claims priority to U.S. Provisional Application Ser. No. 60/470,327, filed May 14, 2003, the contents of which are hereby incorporated by reference as if recited in full herein.

FIELD OF THE INVENTION

The present invention relates to apparatus that can selectively apply closure clips to casing materials that enclose products therein.

BACKGROUND OF THE INVENTION

Conventionally, in the production of consumable goods such as food or meat products, the food is fed (typically pumped) or stuffed into a casing in a manner that allows the casing to fill with a desired amount of the product. The casing can be produced so that it is sealed at selected locations to form a series of single discrete products or a series of linked "chubs."

One manner of producing a packaged product employs a piece goods packaging machine that can form a single or discrete packaged product or chub. In operation, a first clip is applied to the beginning portion of the casing, the casing is filled with product, and then a second clip is applied to the end portion of the casing. The process is repeated to provide a series of discrete piece good packaged products.

Another way of producing a packaged product employs a shirred casing machine that can be configured to produce a series of single products or a series of chained products. In operation, a clip is applied to the beginning portion of a casing and food is pumped into the casing and the filled casing is moved downstream from the filling point. The filling can be interrupted momentarily while excess product is voided (pushed away from a clip zone on the package) and two clips can be applied concurrently to the casing at proximate but spaced apart lateral locations in the clip zone. A knife is used to separate the casing between the two concurrently applied clips to produce a sealed single package. This region between the two clips is sometimes described as the "tail" or end of the package. The first or forwardmost of the two clips forms the end of the forward (first) sealed product and the second or rearwardmost of the two clips forms the beginning of the next upstream package, which is now ready for filling which is restarted.

For certain consumable products, such as meat and/or sausage, there is often a desire to produce a series of closed packages that are linked or chained together. Thus, similar to the shirred single piece production method, two clips can be applied concurrently to a voided casing region, which action is repeated a number of times before cutting any of the links to generate a series or chain of linked "chubs." Thus, in operation, a desired number of chubs can be serially produced to form the desired length of product or number of chubs. This process can be described as a "chubbing operation." After the desired length of product and/or number of chubs is generated, the casing is voided and the two clips are concurrently applied to the casing as described above. The knife is then directed to cut the chain at the tail and start a new chain of linked product. The linked or chained products are typically vertically suspended together for further processing. See, e.g., U.S. Pat. Nos. 3,543,378, 5,167,567, 5,067,313, and 5,181,302, the contents of which are hereby incorporated by reference as if recited in full herein.

During a conventional chubbing operation, an unused (non-stuffed) length of casing or packaging material extends outwardly from the enclosed product between the first and second concurrently applied clips. The amount of unused length of casing can vary depending on the packaging machine, the type of package and/or product.

In certain applications, it is desirable to reduce the amount of unused lengths of casing to be able to do one or more of: reduce product costs (material cost savings), increase the amount of yield in the cooking facility, and suspend additional amounts of product or numbers of chubs on or in conventional racks for increased space utilization.

U.S. Pat. No. 5,495,701 proposes a clip attachment mechanism for fastening a single clip or two clips simultaneously. The mechanism has two punches, one of which is driven directly by a pneumatic cylinder and the other of which is connected to the first punch using a pin and key assembly. The pin and key assembly allows the punches to be coupled or decoupled to the pneumatic cylinder drive to apply one single clip or two clips simultaneously. U.S. Pat. No. 5,586,424 proposes an apparatus for movement of U-shaped clips along a rail. The apparatus includes a clip feed for advancing clips on a guide rail and the arm is reciprocally driven by a piston and cylinder arrangement. The contents of each of these patents are hereby incorporated by reference as if recited in full herein.

Despite the foregoing there remains a need for devices and methods that can provide reduced amounts of unused casing material between adjacent sealed products and or additional links in a chain having a desired length for increased processing efficiency.

SUMMARY OF EMBODIMENTS OF THE INVENTION

Embodiments of the present invention provide devices, systems, methods and computer program products for selectively advancing and retracting clips along a clip feed path to automatically feed or withdraw a clip from a clip attachment mechanism to apply one closure clip alone or two closure clips concurrently to an encased product.

Certain embodiments are directed to methods for supplying a clip to a clip window associated with a closure attachment mechanism having a closure punch path for attaching a single clip or two clips to a target tubular work piece in a closure zone. The method includes: (a) forcing a plurality of clips to travel in a first predetermined clip travel path having a forward direction toward a first punch path in a closure zone at a first point in time; (b) selectively retracting the plurality of clips so that the clips travel in a reverse direction along the first predetermined clip travel path; and then (c) forcing the plurality of clips to again travel in the forward direction along the first predetermined clip travel path at a second point in time.

The forcing steps can be carried out by pushing the clips forward along a clip feed path and the retracting step can be carried out by pulling the clips rearward along the clip feed path.

Other embodiments are directed to methods for supplying a clip to a clip window associated with a closure attachment mechanism having a closure delivery path for allowing attachment of a single clip or two clips to a target tubular work piece in a closure zone. The methods include: (a) pushing a plurality of clips to travel in a first predetermined clip travel path having a forward direction toward a first closure delivery path in a closure zone at a first point in time; (b) selectively pulling the plurality of clips so that the clips travel in a reverse direction along the first predetermined clip travel path; and then (c) pushing the plurality of clips to again travel in the forward direction along the first predetermined clip travel path at a second point in time.

Other embodiments are directed to apparatus for supplying a clip to a clip window associated with a closure attachment mechanism having a closure delivery path for attaching a single clip or two clips to a target tubular work piece in a closure zone. The apparatus includes: (a) means for forcing a plurality of clips to travel in a first predetermined clip travel path having a forward direction toward a first closure delivery path in a closure zone at a first point in time; (b) means for selectively retracting the plurality of clips so that the clips travel in a reverse direction along the first predetermined clip travel path; and then (c) means for forcing the plurality of clips to again travel in the forward direction along the first predetermined clip travel path at a second point in time.

The apparatus may include means for holding the plurality of clips above a first clip window associated with the first closure delivery path in the closure zone for a desired interval, the interval associated with the number of target tubular workpieces that pass through the closure zone without receiving a clip from the first closure delivery path.

Still other embodiments are directed to systems for attaching closure clips to elongate or tubular products held in casing materials. The systems include: (a) a curvilinear clip rail having opposing top and bottom end portions and defining a generally downwardly extending clip feed direction; (b) a clip entry window in communication with the bottom end portion of the clip rail and a clip closure delivery path in communication with an attachment mechanism that is adapted to wrap a clip about a target tubular work piece; (c) a clip pusher configured to selectively engage with clips held on the clip rail to force the clips in the feed direction; and (d) a clip retraction assembly configured to selectively engage with clips held on the clip rail to force the clips away from the clip window and away from the clip feed direction.

In certain embodiments, the systems may also include: (e) a first actuation cylinder in communication with the clip pusher; (f) a second actuation cylinder in communication with the clip retraction member; and (g) a control module configured to direct the actuation of the first and second cylinders to selectively feed (and hence not continuously feed) a clip through the clip window.

Still other embodiments are directed to computer program products for operating a shirred casing voiding/clipping apparatus having two proximate clip attachment mechanisms with first and second clip travel paths to selectively deliver one clip or two clips concurrently to a chain of linked chub product. The computer program products include a computer readable storage medium having computer readable program code embodied in the medium. The computer-readable program code includes: (a) computer readable program code that controllably actuates a first actuation cylinder to push clips in a first clip feed direction; and (b) computer readable program code that controllably actuates a second actuation cylinder to pull clips away from the clip feed direction.

In certain embodiments, the computer readable program code can allow a user to select a desired number of links of chubs and/or a desired chain length of linked chubs and computer program code that directs the first and second actuation cylinders to apply the appropriate number of single and dual clips at the appropriate links in the chain.

These and other objects and/or aspects of the present invention are explained in detail in the specification set forth below.

DESCRIPTION OF EMBODIMENTS OF THE INVENTION

Figure 1:
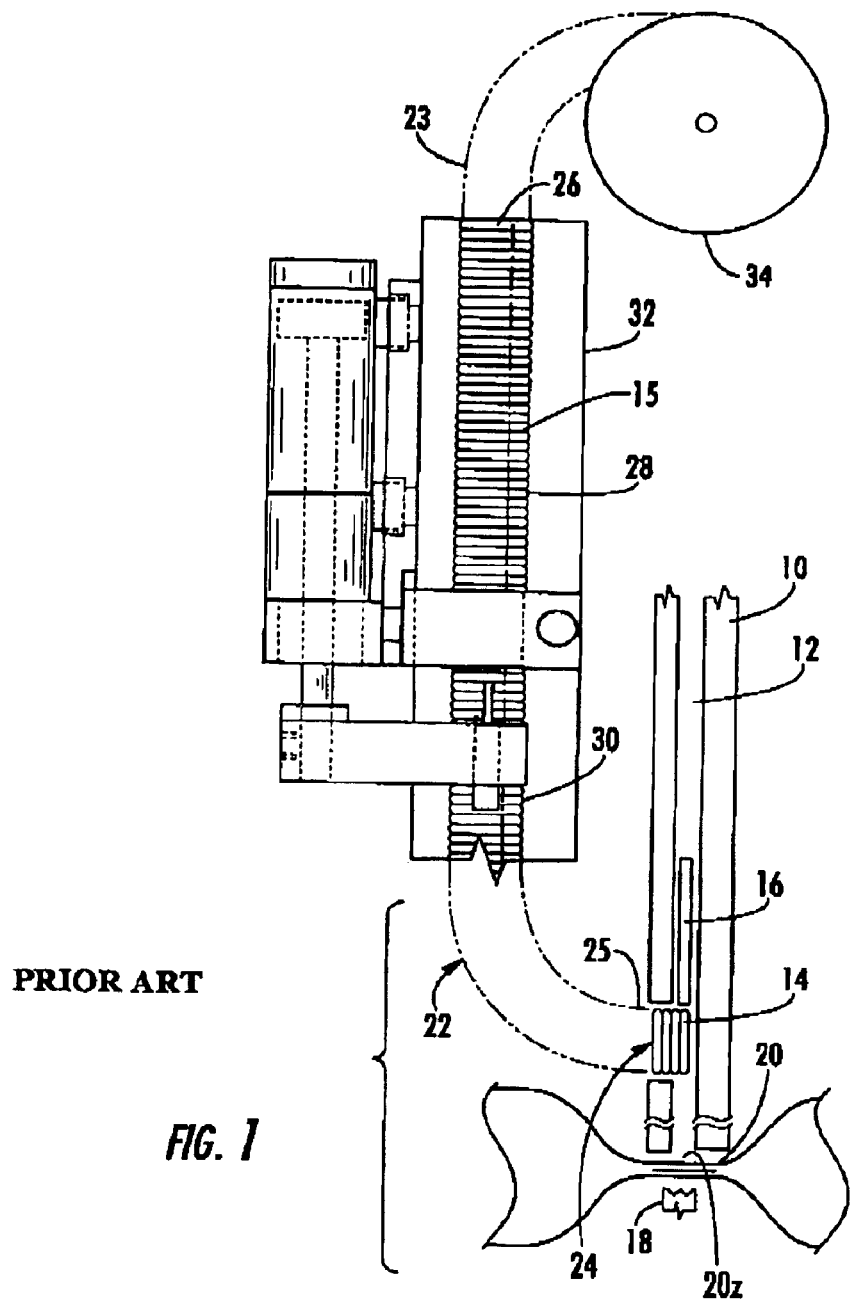
FIG. 1 is a side elevation view of a prior art apparatus used to apply clips via a clip punch attachment mechanism.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the claims unless specifically indicated otherwise. Where used, the terms "attached", "connected", "contacting", "coupling" and the like, can mean either directly or indirectly, unless stated otherwise. The term "concurrently" means that the operations are carried out substantially simultaneously.

In the description of the present invention that follows, certain terms are employed to refer to the positional relationship of certain structures relative to other structures. As used herein, the term "front" or "forward" and derivatives thereof refer to the general or primary direction that the clips travel toward a target product for closure and/or the direction that the target filled or stuffed product in casing material travel; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

The present invention is particularly suitable for applying closure clips to seal flexible products held in casings. The product may be a linked chain of elongated extruded product held in a casing. The casing can be any suitable casing (edible or inedible, natural or synthetic) such as, but not limited to, collagen, cellulose, plastic, elastomeric or polymeric casing. The elongated or tubular product can be an elongated meat product. Exemplary meat products include, but are not limited to, strands of meat (that may comprise pepperoni, poultry, and/or beef or other desired meat), and processed meat products including whole or partial meat mixtures, including sausages, hotdogs, and the like. Other embodiments of the present invention may be directed to seal other types of food (such as cheese) or other product in casing materials. Examples of other products include powders such as granular materials including grain, sugar, sand, sand and the like or other flowable materials including wet (similar to that held conventionally in cans) pet food or other powder, granular, solid, semi-solid or gelatinous materials. The product may be a packaged in any suitable industry including food, aquaculture, agriculture, environment, chemical, explosives, or other application.

The elongated product can be produced in a linked chain of tubular or chub product. The length and diameter of each link or chub as well as the overall length of the chain can vary depending on the type of product being produced. Examples of typical strand or chain lengths are between about 1–6 feet.

Generally stated, clips are applied to the casing material to wrap around and close or seal the product therein. The seal formed by the clip against the casing may be sufficiently strong so as to be able to hold a vacuum of about 16 mm Hg for about 24–48 hours. Examples of suitable clips include metallic generally "U" -shaped clips available from Tipper Tie, Inc., in Apex, N.C. Other clips, clip materials and clip configurations may also be used.

Referring to FIG. 1, one example of a prior art clip attachment apparatus with a clip advancement mechanism is illustrated. Typically, the clip attachment apparatus includes a housing 10 that defines a closure delivery path or channel 12 for receipt of a U-shaped metal clip 14. The clip 14 is advanced in the closure path or channel 12 by means of a punch 16 so that the clip 14 will engage a die 18 positioned in a manner permitting the clip 14 to be formed about gathered material 20 that encases the product in the material 20 at closure zone 20z in the product travel path. Although not illustrated, pressurized air or other means of pressing or moving the clip to close about the tubular package may also be used.

Each clip 14 is typically fed from a clip guide rail 22 through a clip window 24 into the closure path or channel 12 so that a respective one of the clips can be aligned in the path 12. As shown, the guide rail 22 has a curvilinear configuration with a vertical run 23 which is curved at its lower end so that it gradually merges into a horizontal run 25 to direct clips 14 mounted thereon into the window 24. As shown in FIG. 1, the clips 14 are typically arranged in a stack 15 with adjacent clips 14 abutting each other so that the legs 26 of each clip 14 fit around the guide rail 22 with a crown 28 of each clip 14 fitting over the guide rail 22. The multiple clips 14 may be connected to one another by means of a thin elastomeric film, tape or adhesive 30 (typically along the crown 28) so that the clips 14 together may slide down the guide rail 22 and around the bend therein between the vertical and horizontal runs 23, 25 of the guide rail. Typically, clips 14 are provided in a coil or on a reel 34 for feeding onto the guide rail 22. The reel 34 is schematically depicted in FIG. 1 for feeding of the clips 14 onto the guide rail 22. Although illustrated herein as a generally vertical and downwardly directed clip feed, other feed orientations (upward, lateral, angular or the like) may also be used.

Figure 2A:
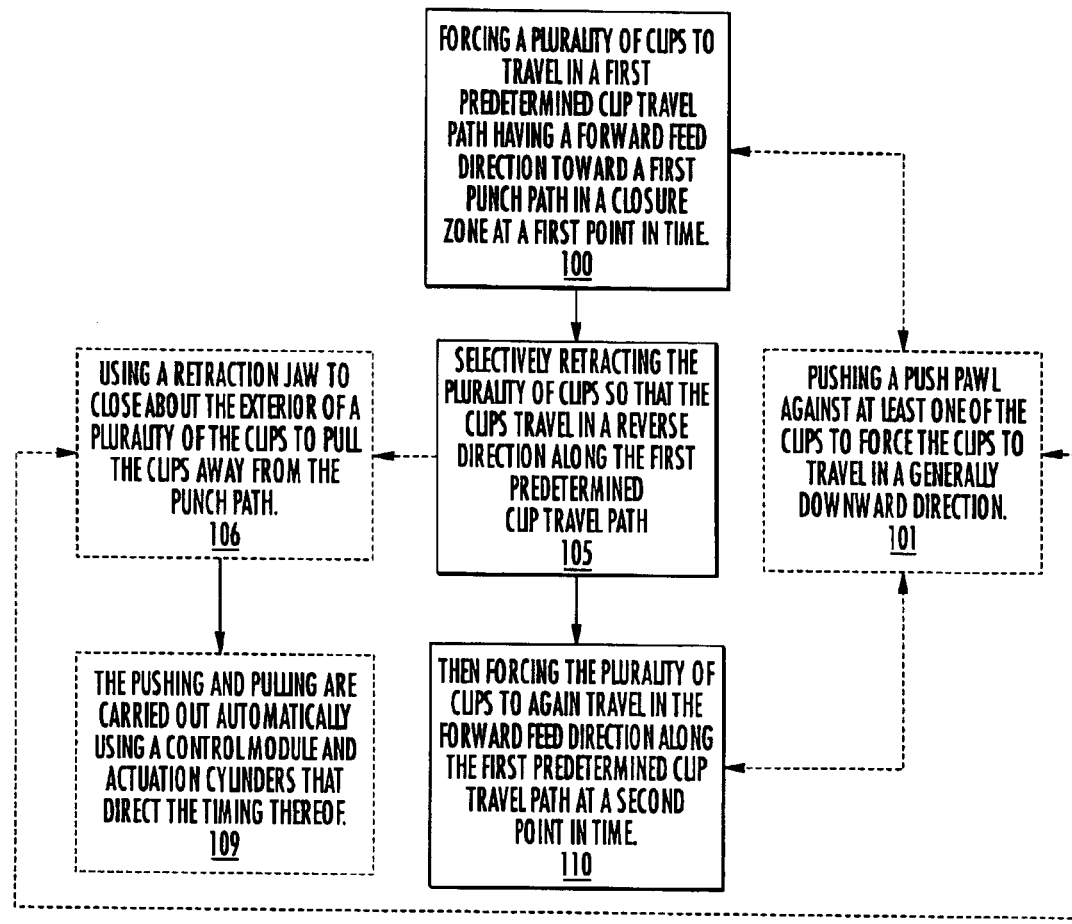
FIG. 2A is a block diagram of operations that can be carried out according to embodiments of the present invention.

Turning now to FIG. 2A, operations that can be used to carry out embodiments of the invention are shown. A plurality of clips are forced (by gravity and/or active propulsion) to travel in a first predetermined clip travel path having a forward feed direction toward a first closure delivery path (such as a punch path) in a closure zone at a first point in time (block 100). The plurality of clips are selectively retracted so that the clips travel in reverse along the first predetermined clip travel path (so that no clip is fed into the clip window) (block 105). The clips are then forced to travel in the forward feed direction along the first predetermined travel path at a second point in time (block 110).

The forcing operations can be carried out by urging a push pawl against one or more of the clips to force the clips to travel in a generally downward and/or forward direction (block 101). The retracting operation can be carried out by using a retraction jaw that can close about the exterior of at least one (typically a plurality) of clips to draw the clips away from the clip window or punch channel (block 106). The forward and reverse motion of the clips (which may be carried out by pushing and pulling the clips) can be automatically performed using a control module that actuates cylinders associated with a respective one of the push pawl and retraction jaw to direct the timing thereof (block 109). When the clips are moved forward, a clip can be fed through the channel 12 (FIG. 1) to close about an underlying product; when the clips are retracted, although a punch may still operate in the channel 12, it punches a blank or air as no clip is in the channel. This method allows a single clip to be applied to a plurality of the tails of the chubs while the dual clips are applied only to selected chubs (such as the chubs at the beginning and/or end of the chain).

Figure 2B:
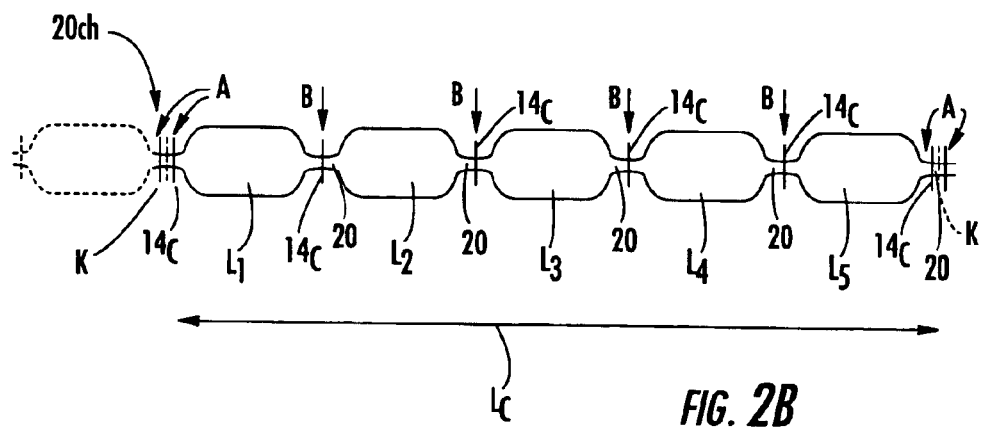
FIG. 2B is a schematic diagram of a linked product having singular and dual closure clips according to embodiments of the present invention.

FIG. 2B illustrates an example of a chain of linked product 20ch that includes clips 14 applied both singularly and in pairs concurrently. As shown, the chain of linked product 20ch includes a forward chub $L_1$, intermediate chubs $L_2$–$L_4$, and a rearward chub $L_5$. The forward chub and the rearward chub, $L_1$, $L_5$ have two clips 14 wrapped thereabout concurrently to form closed clips 14c at a forward tail and one closed clip 14c at a rearward tail (positions marked as "A"). The intermediate links $L_2$–$L_4$ have a single clip 14 applied to voided casing material 20 (marked as positions "B"). A loop may be added to the forward or rearward tail to hang the chain on a subsequent processing apparatus as desired (not shown). The sealed product can be cut between the dual applied clips at position A as indicated by the knife position "K" to release the chain 20ch and start a new chain as desired.

Figure 3:
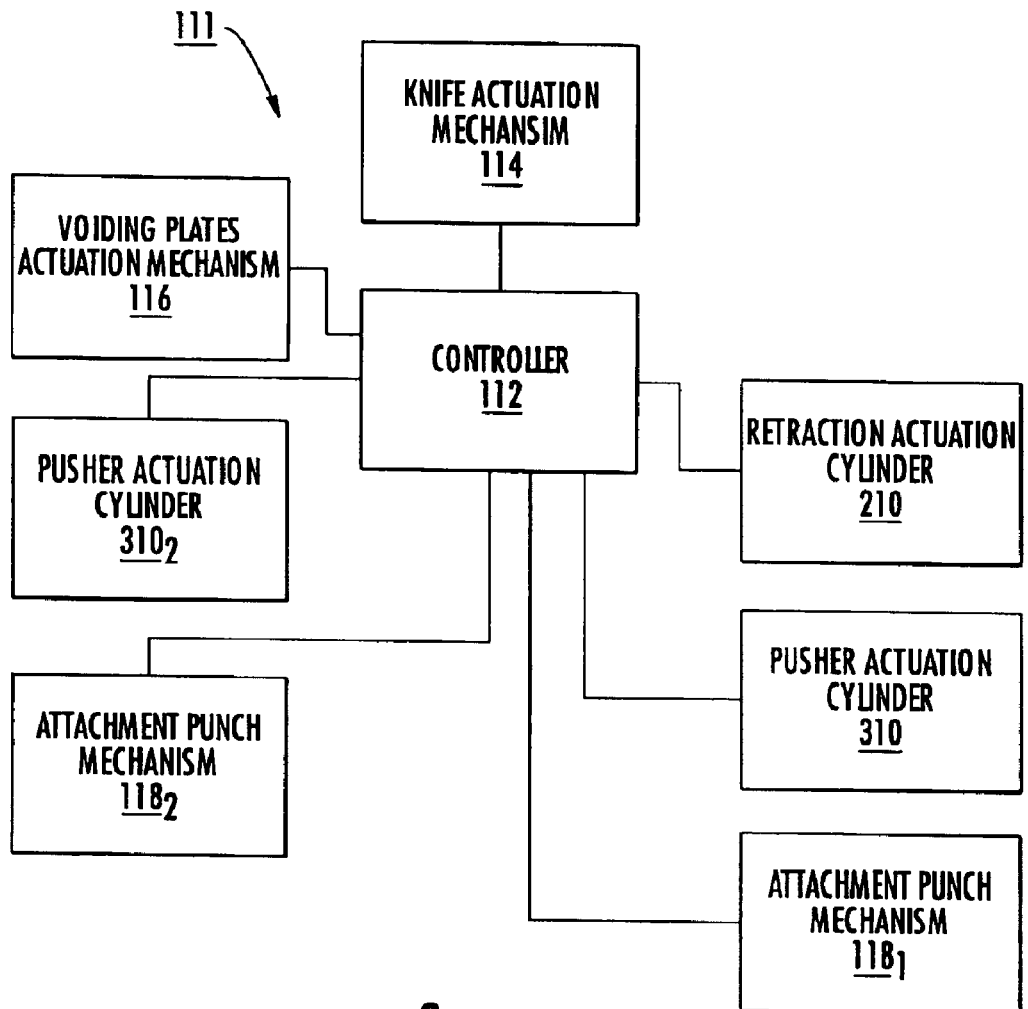
FIG. 3 is a schematic illustration of components of embodiments of the present invention.

FIG. 3 is a schematic illustration of certain components that may be included in a system 111 according to embodiments of the present invention. It will be appreciated that in certain embodiments, two proximately positioned clip attachment mechanisms can be used each with its own clip feed. One clip attachment mechanism can be configured to substantially continuously apply a closure clip to the product with each cycle during production of a chain and the other clip attachment mechanism can be configured to selectively apply a closure clip to the product as described above. As shown in FIG. 3, the system can include a controller 112 that may be configured to direct the actuation of a retraction actuation cylinder 210 and first and second pusher actuation cylinders $310_1$, $310_2$. The controller 112 may also be configured to control the operation of a voiding plate(s) actuation mechanism 116 that can be used to clear the filler material from the casing 20 (FIG. 1) before the closure clip is attached thereto, as is well known to those of skill in the art. The controller 112 can be used to separately and/or jointly actuate (typically in concert) both the first and second attachment punch mechanisms $118_1$, $118_2$ (that may engage punch 16 as shown in FIG. 1, or a different punch or attachment mechanism) associated with the first and second clip attachment mechanisms. The controller 112 may also be configured to direct the actuation of the knife actuation mechanism 114 that is used to separate serial chains between closure clips.

Figure 4:
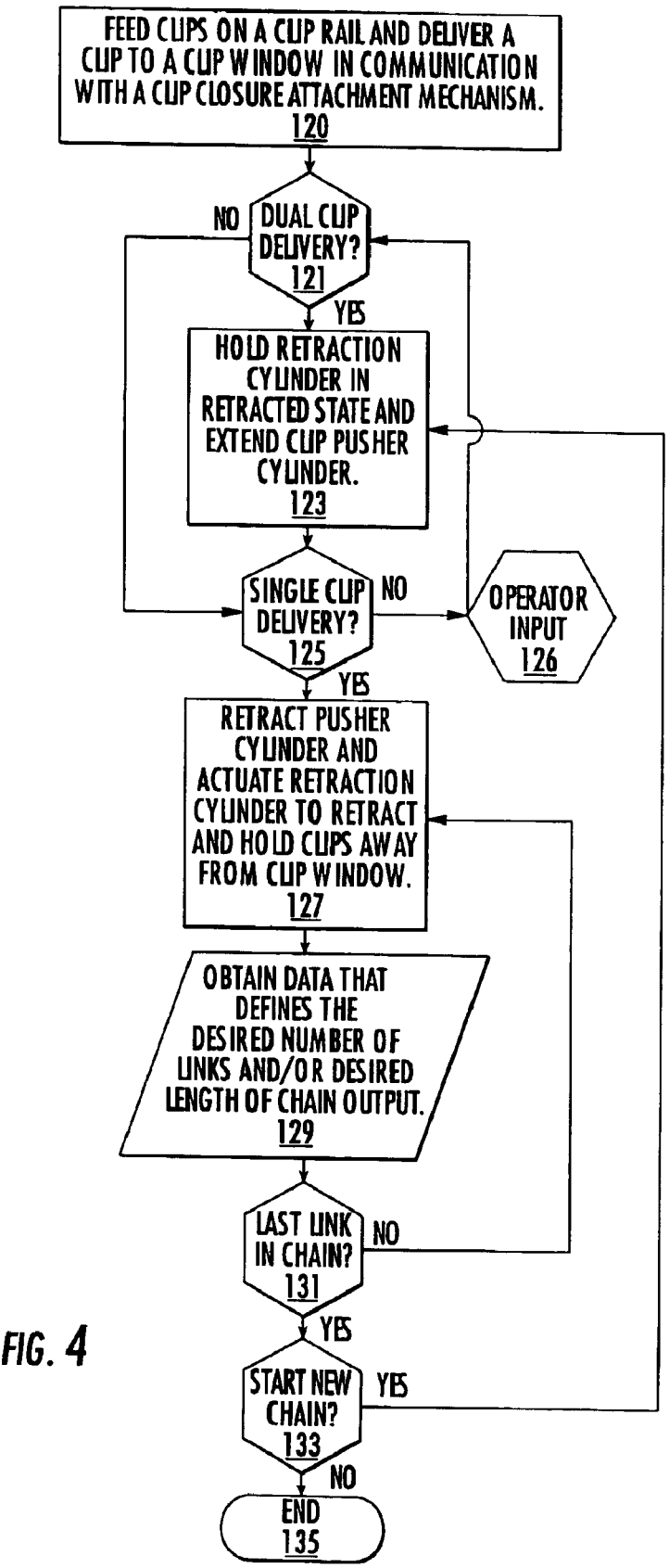
FIG. 4 is a flow chart of operations that can be carried out according to embodiments of the present invention.

FIG. 4 is a flow chart of operations that can be used to automate the closure process according to embodiments of the present invention. Clips are fed on a feed rail to a clip window in communication with a clip attachment mechanism (block 120). It is determined whether a dual clip delivery is desired at this time. If no, it is decided whether a single clip delivery is desired (block 125). If it is determined that a dual clip delivery is desired, the retraction cylinder is held in a retracted state and the clip pusher cylinder can be extended (block 123). It is then determined whether a single clip delivery is desired (block 125); if not, it can be queried again whether another dual clip is desired (block 121) or whether to ask for operator input (block 126). If single clip delivery is desired, the pusher cylinder is retracted and the retraction cylinder is actuated to retract the clips away from the clip window (block 127). Sensors can obtain data that can be interrogated to determine whether the desired number of links and/or desired length of chain has been produced (block 129). It can be determined whether the link is the last in the chain. If so, a new chain can be started after applying two clips (block 123). If no, the retraction cylinder can be maintained in its engaged position with the clips held away from the clip window (block 127).

Figure 5:
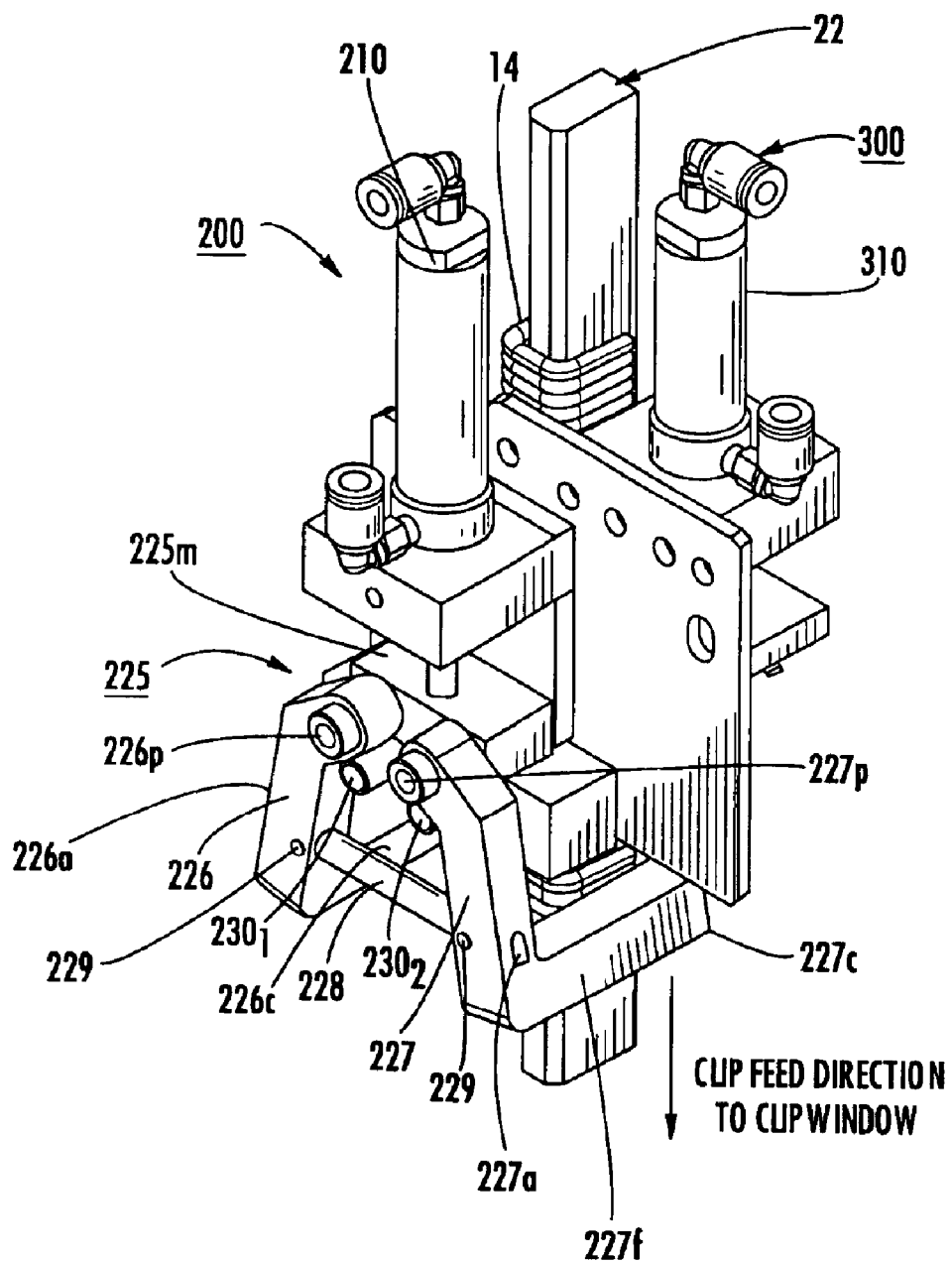
FIG. 5 is a perspective view of a clip retraction assembly according to embodiments of the present invention.

FIG. 5 illustrates one embodiment of a retraction assembly 200 with a retraction assembly actuation cylinder 210. Also shown is a clip advancement mechanism 300 with its respective actuation cylinder 310. As shown, the retraction assembly 200 includes a retraction jaw 225 with legs 226, 227 that are pivotably attached to a mounting bracket 225m at a corresponding first end portion thereof 226p, 227p. The mounting bracket 225 is operatively associated with the cylinder 210 and moves up and down as the cylinder 210 is actuated, as will be discussed further below.

Still referring to FIG. 5, the retraction jaw 225 can include an extension spring 228 that extends between the legs 226, 227. Each leg 226, 227 may include an aperture 226a, 227a with a pin 229 extending across that can hold opposing ends of the spring 228 to bias the legs 226, 227 to move toward each other in operation. In certain embodiments, the spring 228 can be a coil spring, which can apply a desired biasing spring force to help bring the legs 226, 227 together. An example of a suitable spring is a spring made from 0.026 stainless steel wire with a standard 1" length. The spring ratings can be about 2.43 pounds per inch (typically about +/−10%) with a deflection at load of about 0.94 and a load of about 2.66 in-lb. The spring length at mechanism rest is about 1.727 inches and the spring length at mechanism engaged is about 1.233. Typically, there is little force (such as less than about 1.5 in-lb) applied to the retraction legs 226, 227 and/or fingers 226f, 227f to bring them together.

Figure 9A:
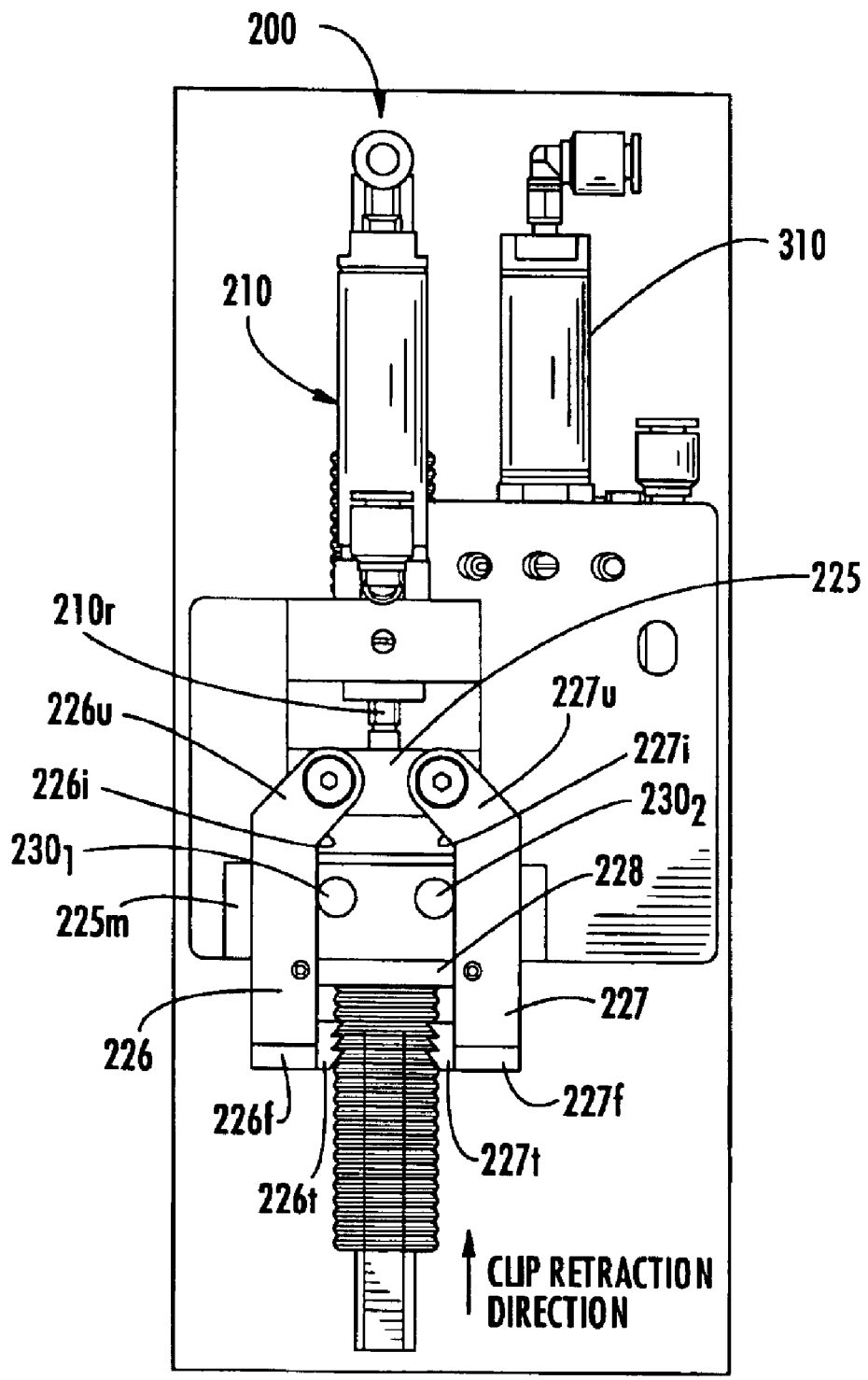
FIG. 9A is a front view of the clip retraction assembly shown in FIG. 5 illustrated with the clip retraction cylinder in a retracted state and the retraction jaw engaged with the clips according to embodiments of the present invention.

The retraction jaw 225 can also include two jaw stop pins $230_1$, $230_2$ that reside inside of and below the first end portions of the legs 226, 227. The jaw stop pins $230_1$, $230_2$ may be alternately configured as a single pin or track that can extend across the jaw retraction bracket or frame 225 a sufficient distance to engage both legs 226, 227. The second end portions 226c, 227c are configured to engage the clips 14 to move the clips 14 away from the clip window 24 and/or the clip closure path 12 (FIG. 1). As shown in FIG. 5, the second end portions 226c, 227c are lower portions of the legs 226, 227 which include outwardly extending fingers 226f, 227f that can be configured to straddle a portion of the outer perimeter of the clip 14 (FIG. 9A). As shown, the fingers 226f, 227f can extend across a major portion of the length of the clip legs 14L (FIG. 9C) leaving the crown 14C (FIG. 9C) area substantially open. However, other gripping or contacting configurations may also be used as long as sufficient force is applied to the clips 14 to be able to selectively and controllably retract them away from the clip window 24 (FIG. 1) and, in certain embodiments, so as to be able to hold the clips 14 in a retracted position for a desired interval.

Figure 6:
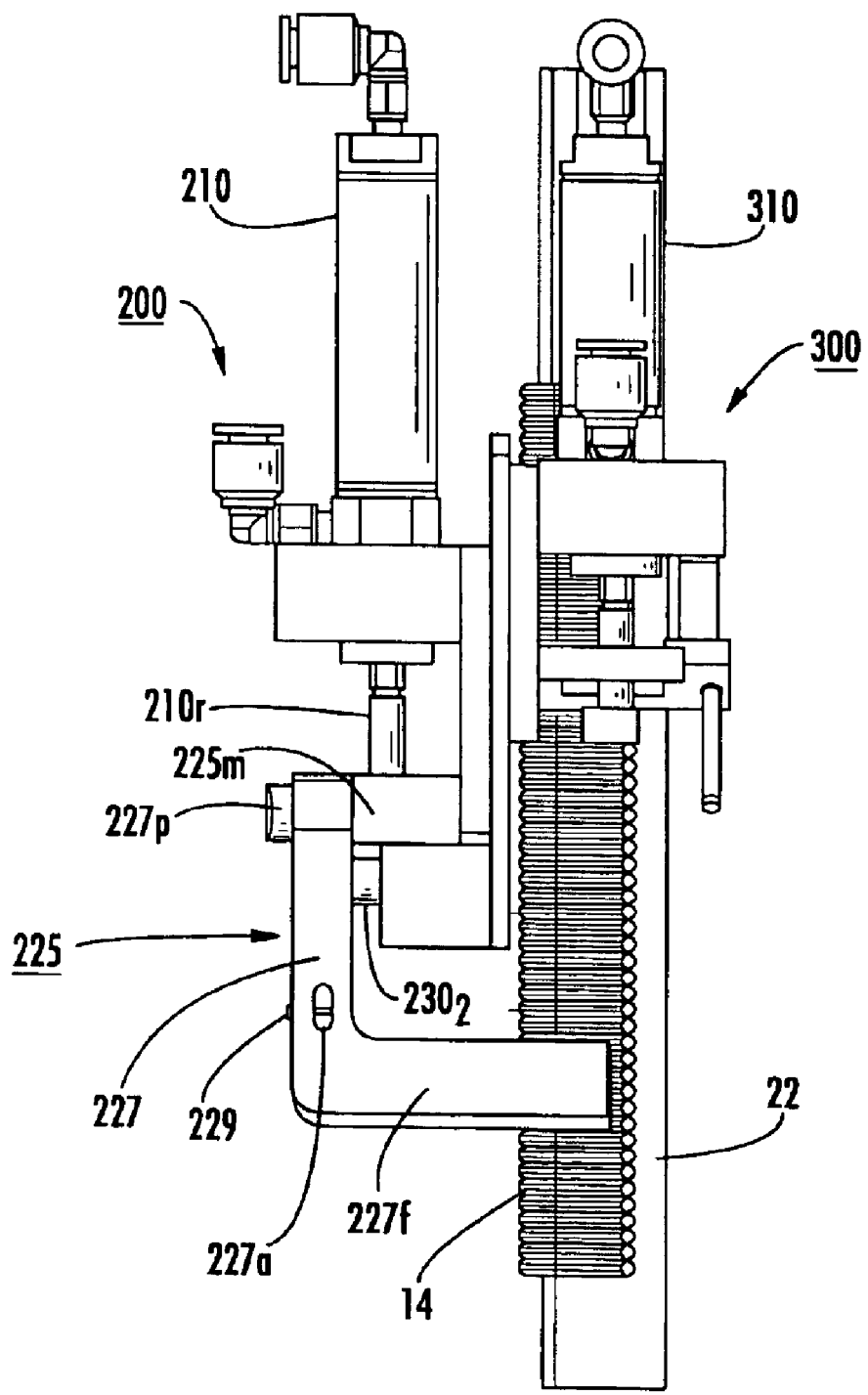
FIG. 6 is a right side view of the retraction assembly of FIG. 5 in an exemplary rest position according to embodiments of the present invention.
Figure 7:
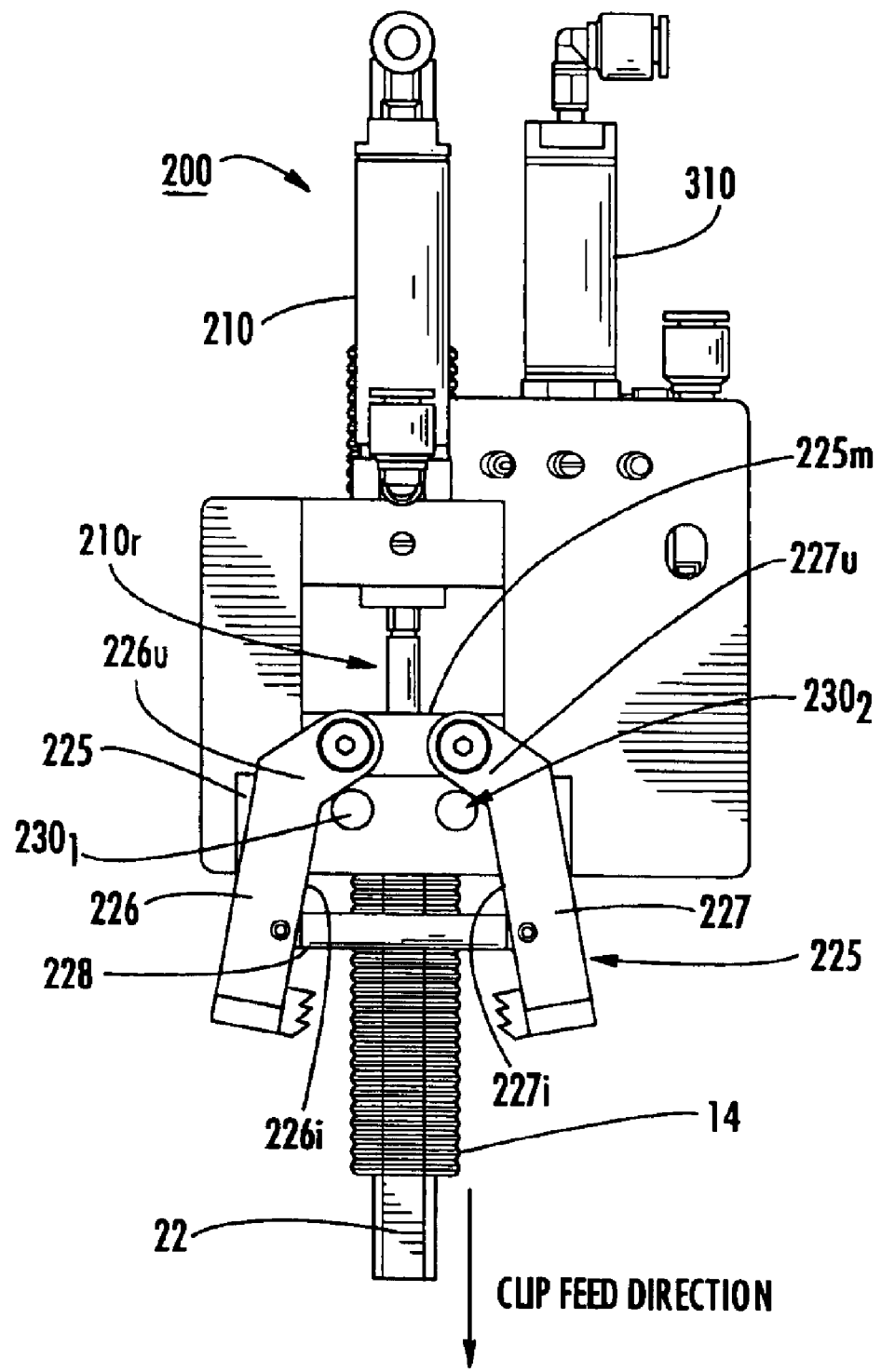
FIG. 7 is a front view of the retraction assembly shown in FIG. 6 in the exemplary rest position.

FIG. 6 illustrates the retraction assembly 200 and the clip advancement assembly 300 with the retraction assembly 200 and retraction jaw 225 in a rest position and with the cylinder 210 placing the rod 210r in an extended position. FIG. 7 also illustrates the retraction assembly 200 and retraction jaw 225 in the rest position with rod 210r actuated to the extended position and the legs 226, 227 of the jaw 225 spread apart and disengaged from the clips 14. During normal operation (in which single clip applications are not used), the system may be operated so as to leave the jaw retraction cylinder 210 with the jaw legs open, which allows the clip pusher cylinder 310 to cycle during each machine cycle (as shown in FIG. 8A).

As shown in FIG. 9A, the fingers 226f, 227f extend outwardly a distance sufficient to straddle opposing sides of the clip or clips 14 (shown as contacting two abutting clips 14) and the inner surface of the fingers 226f, 227f can be formed with a tooth profile that, upon contact, can mate with the profile of abutting clips 14. Other gripping configurations can also be used. For example, the fingers 226f, 227f may include surfaces with materials which can frictionally engage the clips 14, such as elastomeric or rubber coatings. In addition, the retraction jaw may be configured to engage only one side of the clips or other portions of the clips.

Figure 8A:
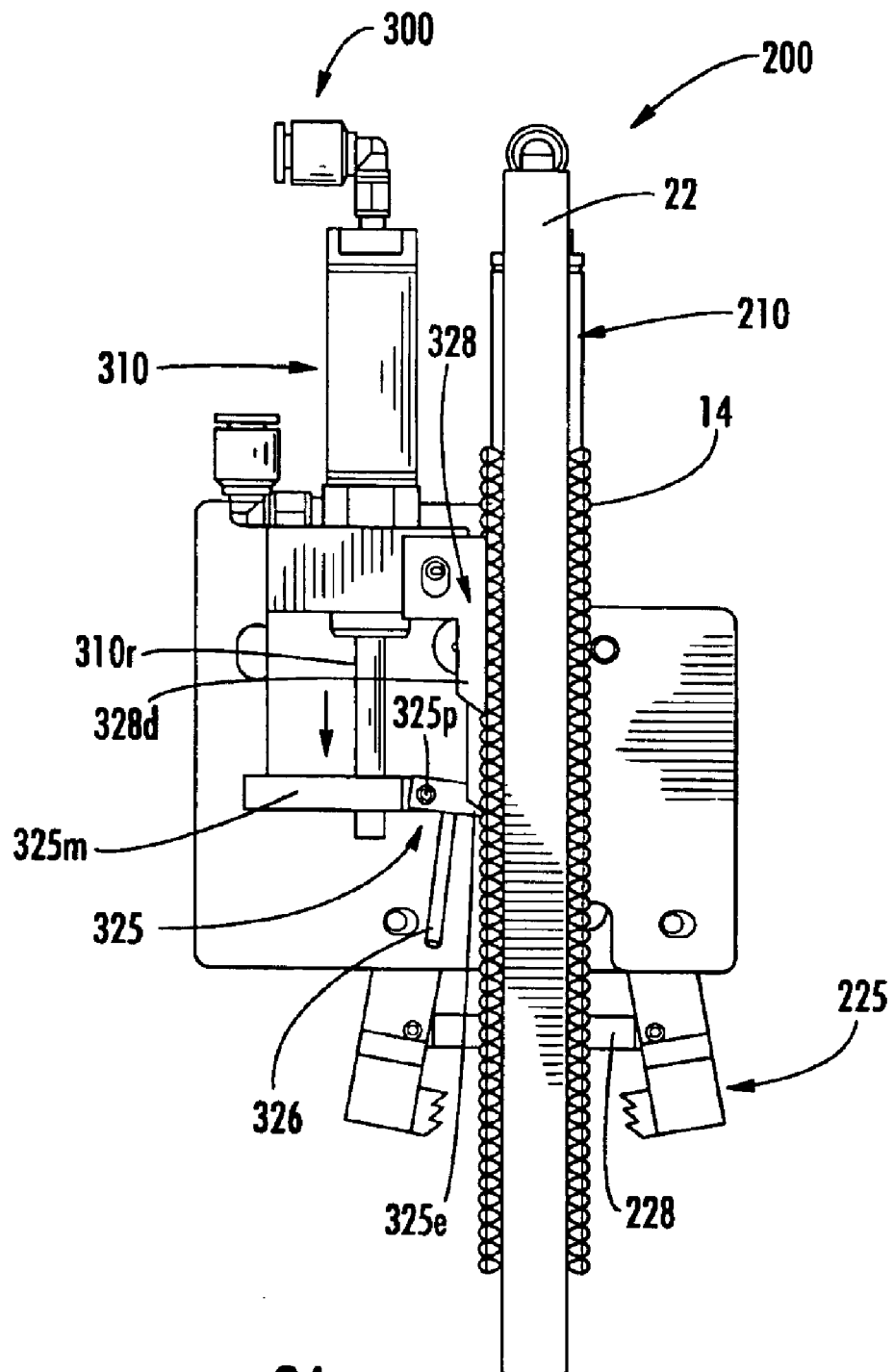
FIG. 8A is a back view of the retraction assembly shown in FIG. 5 with the clip pusher assembly in an extended state and the clip pusher engaged with clips to advance same along a feed direction according to embodiments of the present invention.

FIG. 8A illustrates the clip advancement assembly 300 with the associated pusher actuation cylinder 310 in operation and with the rod 310r in an extended state. A pusher pawl 325 is pivotably mounted to the bracket 325m at pivot 325*p*. The pusher pawl 325 may also be spring loaded with a torsion spring (not shown) to help provide sufficient downward force onto the clips 14. The pusher pawl 325 includes a forward edge 325*e* portion that engages a clip or clips on the rail 22. The forward edge portion 325*e* may be configured as a protruding tooth which can enter (from a side) the space between abutting clip legs as shown in FIG. 8A. The rod 310*r* is connected to a mounting bracket 325*m* and can move the mounting bracket 325*m*, and in turn, pusher 325, in a desired reciprocating motion. The pusher pawl 325 may also include a manual disengagement lever 326.

Figure 8B:
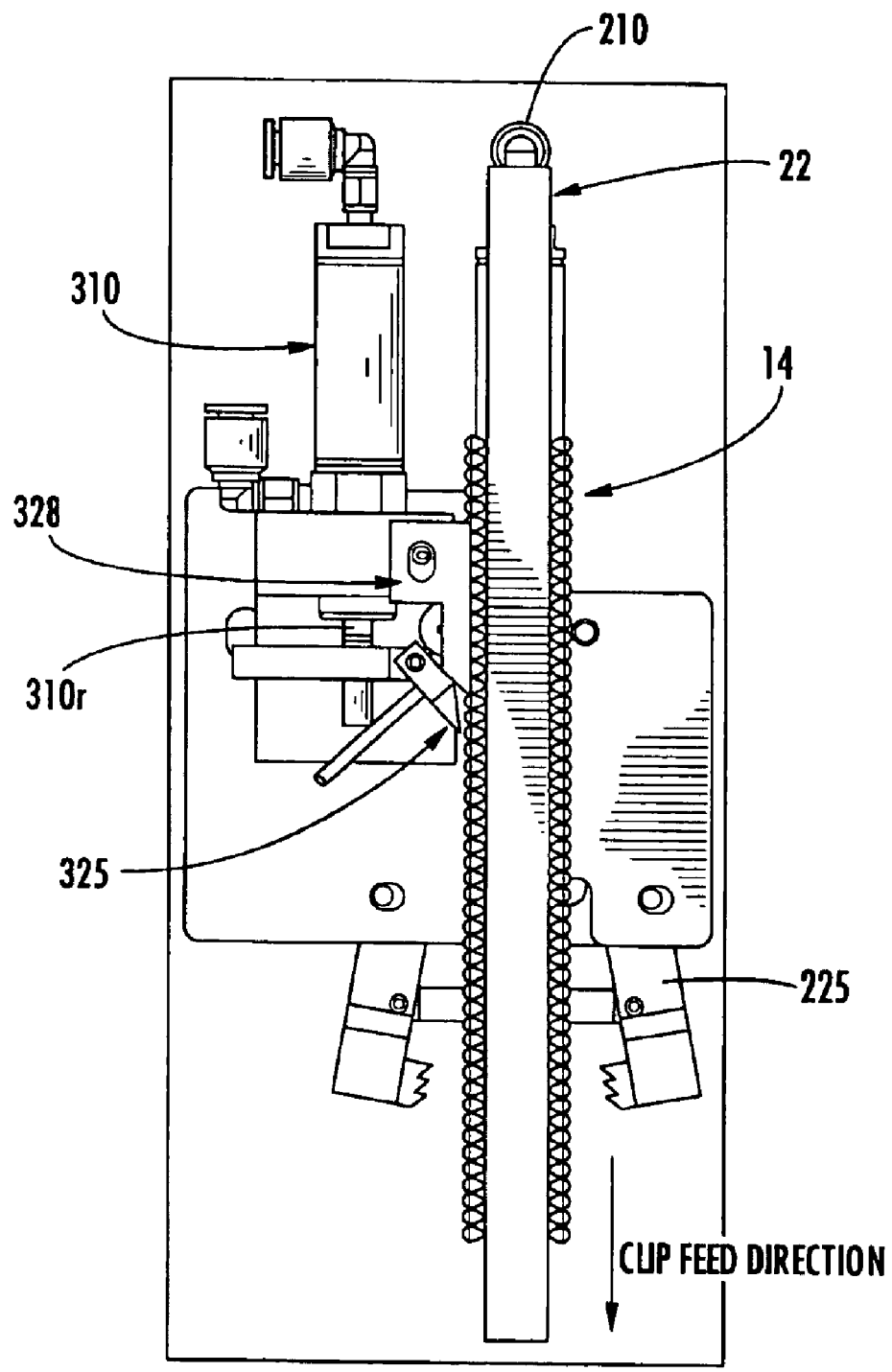
FIG. 8B is a back view of the retraction assembly shown in FIG. 8A with the clip pusher assembly in a retracted state and the clip pusher disengaged from the clips.
Figure 8C:
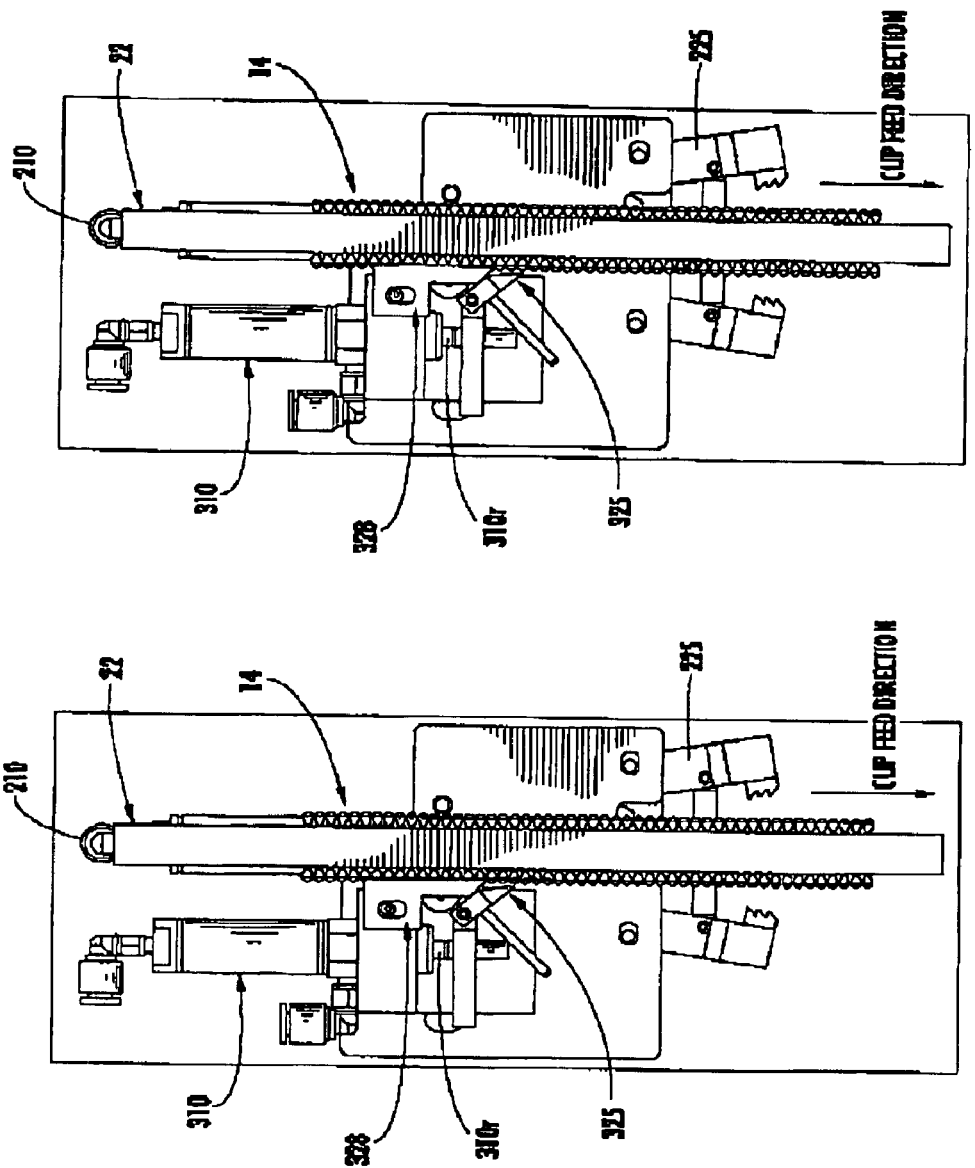
FIG. 8C is a back view of a dual clip path apparatus according to certain embodiments of the present invention.

As also shown in FIG. 8A, the clip advancement assembly 300 can include a stop anvil 328 that can be positioned above the pusher pawl 325. The stop anvil 328 can have a downwardly extending portion 328*d* that, in operation, forces the pusher pawl 325 to pivot down and disengage the clips 14 as shown in FIG. 8B when the cylinder 310 has the rod 310*r* in a retracted state. FIG. 8B show both the clip advancement assembly 300 with the associated cylinder 310 and the clip retraction assembly 200 with the associated cylinder 210 in a rest state (i.e., neither engaged with clips). FIG. 8C shows that the clipping apparatus employ the clip advancement assembly 300. In other embodiments, the first and second punch paths may employ differently configured clipping devices, such as one of the punching configurations used in one of the two punch paths shown in the double clipper apparatus described in U.S. Pat. No. 5,167,567 and/or U.S. Pat. No. 5,495,701, both incorporated by reference above. In any event, the dual clip paths can be configured so that two spaced apart clips may be applied to a target product generally concurrently as is known to those of skill in the art.

Figure 9B:
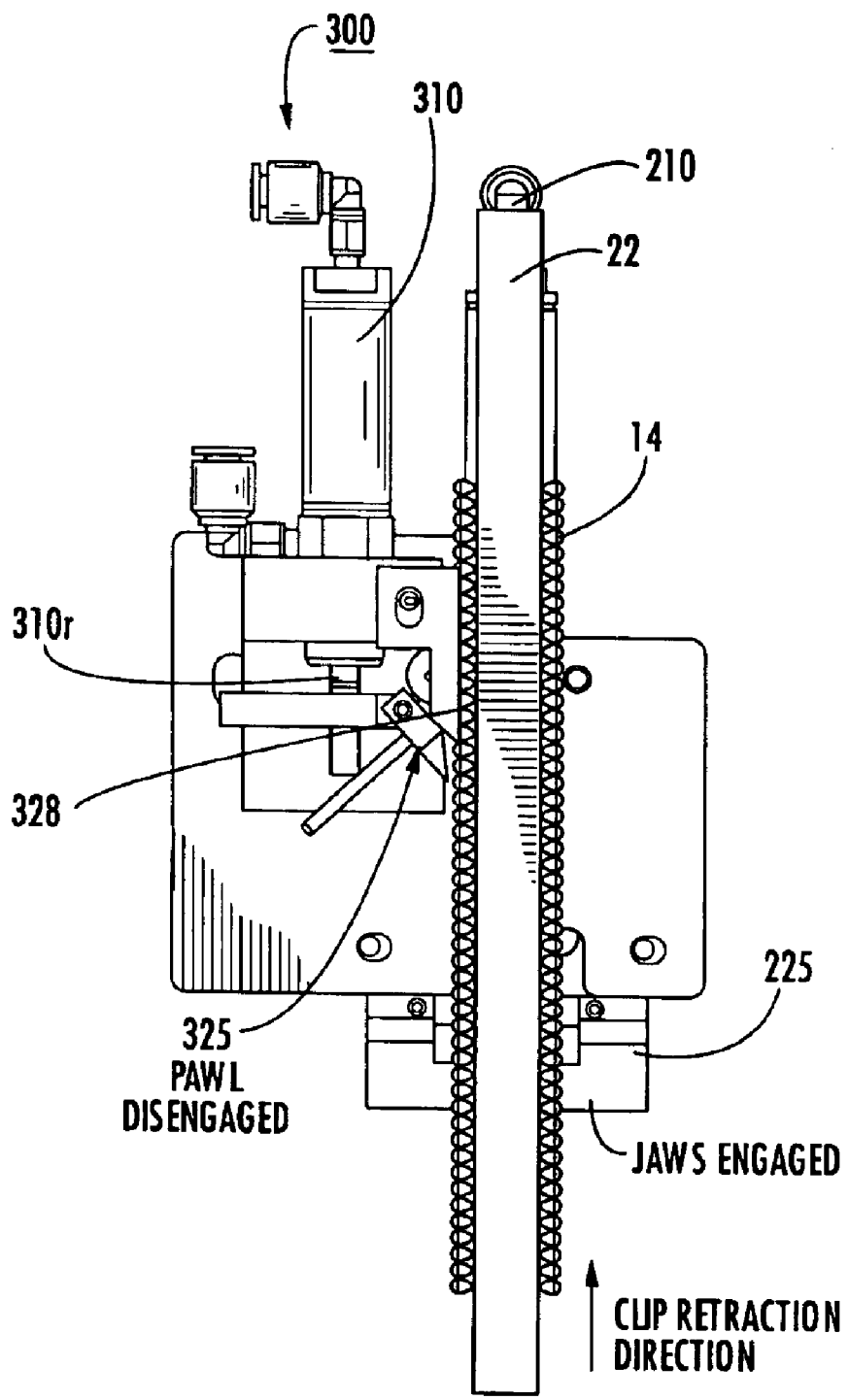
FIG. 9B is a back view of the clip retraction assembly shown in FIG. 5 with the clip retraction cylinder in the retracted state and the retraction jaw engaged with clips while the pusher is disengaged.
Figure 9C:
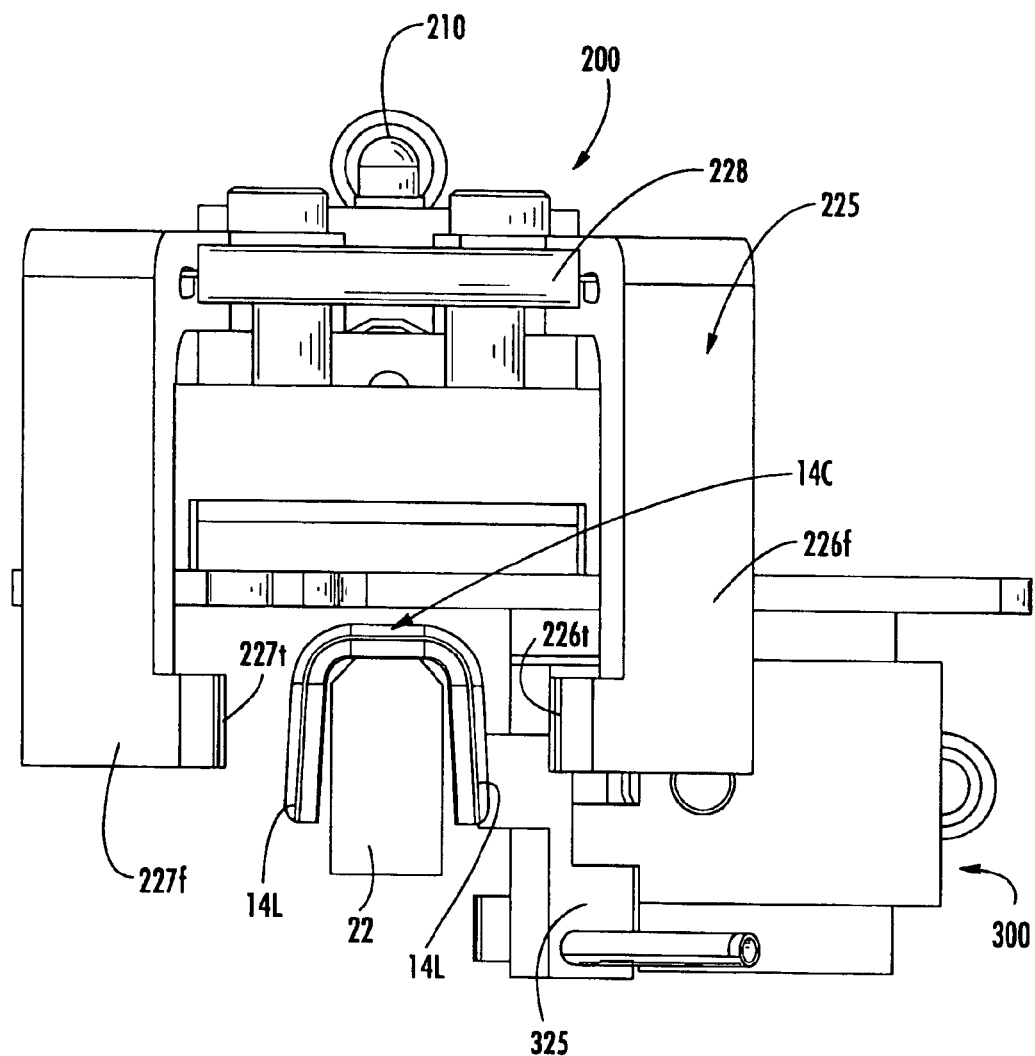
FIG. 9C is a bottom view of the clip retraction assembly shown in FIG. 9B with the retraction jaw disengaged.

FIG. 9A illustrates the retraction assembly 200 with the retraction cylinder 210 actuated to place rod 210*r* in a retracted state and with the jaw 225 engaging the clips 14 to direct the clips 14 to retract (as indicated by the arrow located adjacent the clip rail 22). FIG. 9B illustrates the configuration of the advancement assembly 300 when the retraction assembly 200 operatively engages the clips 14. As shown, the pusher pawl 325 is pivoted down so that it does not engage the clips 14 while the clip jaws 225 are engaged to retract the clips 14. FIG. 9C illustrates the configuration of the jaw 225 with respect to the clip when not engaging the clips 14. As shown, in this embodiment, the clips 14 include a crown 14*c* and two opposing legs 14L. However, as noted above, the present invention can be used with other clip configurations.

Referring again to FIG. 7, as the retraction cylinder 210 is extended (moving toward a rest state), legs 226, 227 move down and the upper portions thereof 226*u*, 227*u* approach the stop pins $230_1$, $230_2$. The inner surfaces of the legs 226*i*, 227*i* act as cam followers, with the jaw stop pins $230_1$, $230_2$ acting as the cam. Thus, as the legs 226, 227 move down responsive to the rod 210*r* moving into the extended state, the legs 226, 227 are forced apart. The jaw stop pins $230_1$, $230_2$ can be statically mounted to remain in a fixed position on the retractor assembly 200 (and/or pusher assembly 300).

As shown herein, the cylinders 210 and 310 move respective brackets 225*m*, 325*m* along a generally vertical actuation axis. However, other actuation orientations may also be used with other clip attachment and/or clip feed configurations. In addition, as shown, the clip advancement assembly 300 is located above the clip retraction assembly 200 so that the advancement assembly 300 pushes the clips 14 in the feed direction and the retraction assembly 200 pulls the clips away from the clip window in the reverse direction. However, the two assemblies 200, 300 can be positioned in the reverse or even at the same vertical position.

The cylinders 210, 310 can be double-acting. As is well known to those of skill in the art, fluid (typically pneumatic) pressure is provided against the surface of the piston to provide a substantially constant and controlled driving force for the respective assembly 200, 300. When the piston reaches the lower end (or upper end) of its run within the cylinder, the fluid driving forces can be reversed so that the piston can return to its initial driving position at the top or bottom of the cylinder.

Now describing a typical sequence of operations, with reference first to FIG. 8A, clips are fed onto the clip rail 22. The clip pusher cylinder 310 extends the rod 310*r* to engage the clip pusher pawl 325 with the clips 14 and push the clips 14 in the feed direction. FIG. 7 illustrates the retraction assembly 200 during this operation. Then, after a dual clip application, or when a single clip application is desired, as shown in FIG. 8B, the clip pusher cylinder 310 retracts the rod 310*r* until the clip pusher pawl 325 is against the stop anvil 328 and the pawl 325 disengages the clips 14. FIG. 7 shows that, starting with the cylinder 210 holding the rod 210*r* in an extended state, air is applied to the rod side of the cylinder 210 causing the cylinder rod 210*r* to retract. As the cylinder 210 and rod 210*r* retract, the legs 226, 227 of the retraction jaw 225 start to close and complete their travel to a closed position to engage the clips 14 as shown in FIG. 9A. The retraction jaw legs 226, 227 are drawn together by the extension spring 228. The timing of the jaw closure can allow the teeth 226*t*, 227*t* to engage the clip legs 14L (FIG. 9C) prior to the retraction cylinder 210 reaching full stroke. Once the retraction jaw teeth 226*t*, 227*t* firmly engage the clips 14, the remaining stroke of the cylinder 210 allows the rod 210*r* to pull the clips 14 away from the clip window and associated attachment mechanism. By preventing a clip from being fed into the attachment device, no clip is applied via the first clip mechanism thereby allowing a single clip to be applied to the product. This operational configuration can remain until the end of the chain of chubs, at which time a double set of clips may be desired as noted above. A knife cut can be made intermediate the dual applied clips to start a new chain and/or release the first chain (shown at position "k" in FIG. 2B). The length and number of chubs can vary as noted above. During the time period from the last single clip application and the end of the chub chain, where a double clip and knife cut is applied, the retraction jaw 225 can return to its rest configuration with the stop jaw pins $230_1$, $230_2$ forcing the legs to open as shown in FIG. 7 and described further above.

The operation and sequence of events can be controlled by a programmable logic controller. The number of pieces in the chain and/or length of the chain can be selected by an operator input using a Human Machine Interface to communicate with the controller as is well known to those of skill in the art.

Figure 10:
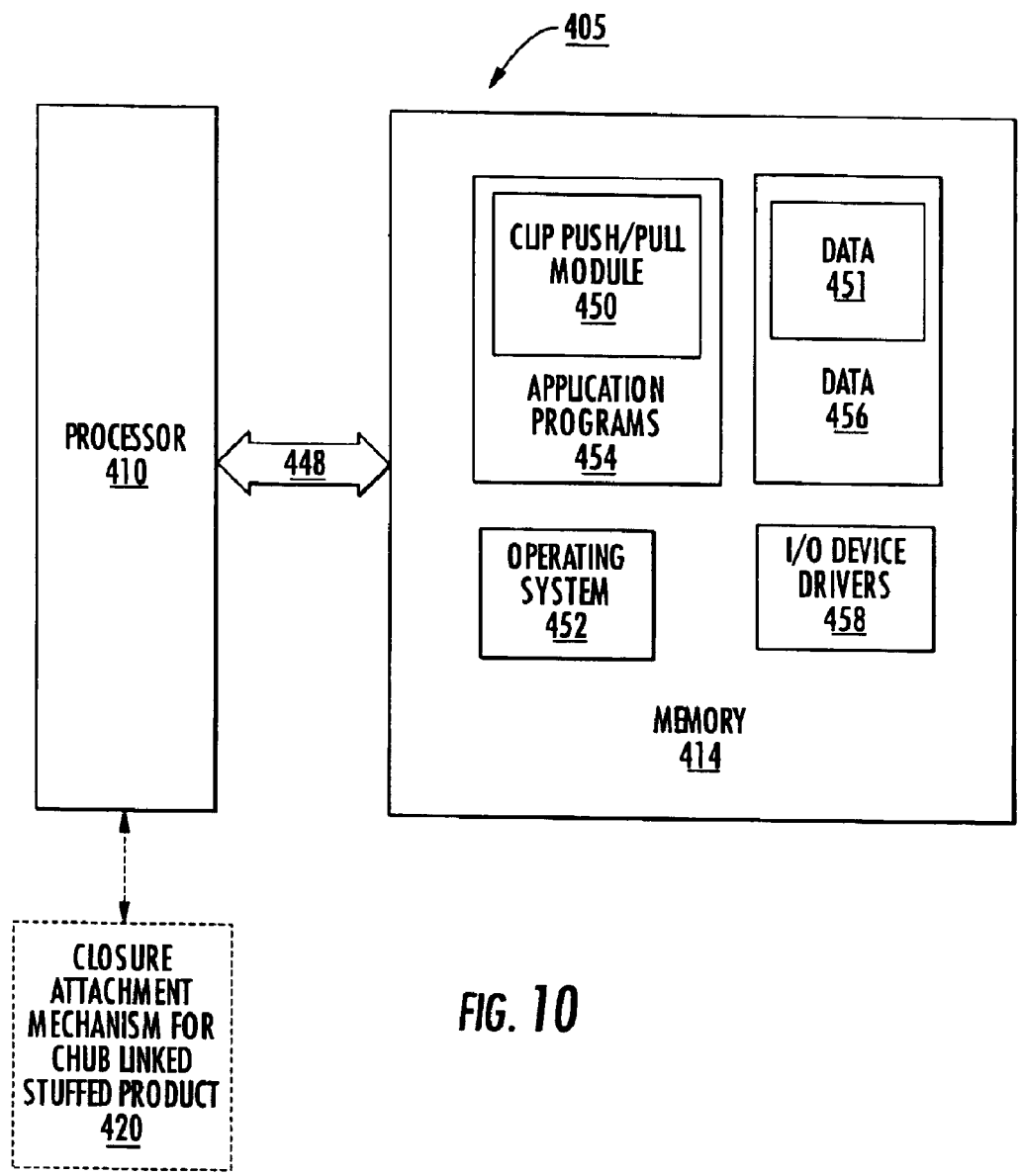
FIG. 10 is a block diagram of a data processing system according to embodiments of the present invention.

FIG. 10 is a block diagram of exemplary embodiments of data processing systems that illustrates systems, methods, and computer program products in accordance with embodiments of the present invention. The processor 410 communicates with the memory 414 via an address/data bus 448. The processor 410 can be any commercially available or custom microprocessor. The memory 414 is representative of the overall hierarchy of memory devices containing the software and data used to implement the functionality of the data processing system 405. The memory 414 can include, but is not limited to, the following types of devices: cache, ROM, PROM, EPROM, EEPROM, flash memory, SRAM, and DRAM.

As shown in FIG. 10, the memory 414 may include several categories of software and data used in the data processing system 405: the operating system 452; the application programs 454; the input/output (I/O) device drivers 458; the clip push/pull control module 450; and the data 456.

The data 456 may include a look-up chart of different products, filling rates, selectable chain lengths and link lengths and the like 451 corresponding to particular or target products for one or more producers, which may be displayed to allow an operator to select desired operational parameters at the start of each shift and/or production run and the like.

As will be appreciated by those of skill in the art, the operating system 452 may be any operating system suitable for use with a data processing system, such as OS/2, AIX, DOS, OS/390 or System 390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems. The I/O device drivers 458 typically include software routines accessed through the operating system 452 by the application programs 454 to communicate with devices such as I/O data port(s), data storage 456 and certain memory 414 components and/or the dispensing system 420. The application programs 454 are illustrative of the programs that implement the various features of the data processing system 405 and preferably include at least one application which supports operations according to embodiments of the present invention. Finally, the data 456 represents the static and dynamic data used by the application programs 454, the operating system 452, the I/O device drivers 458, and other software programs that may reside in the memory 414.

While the present invention is illustrated, for example, with reference to the clip push/pull module 450 being an application program in FIG. 10, as will be appreciated by those of skill in the art, other configurations may also be utilized while still benefiting from the teachings of the present invention. For example, the module 450 may also be incorporated into the operating system 452, the I/O device drivers 458 or other such logical division of the data processing system 405. Thus, the present invention should not be construed as limited to the configuration of FIG. 10, which is intended to encompass any configuration capable of carrying out the operations described herein.

The I/O data port can be used to transfer information between the data processing system 405 and the closure attachment mechanism (such as for chubbed linked product) 420 or another computer system or a network (e.g., the Internet) or to other devices controlled by the processor. These components may be conventional components such as those used in many conventional data processing systems which may be configured in accordance with the present invention to operate as described herein.

While the present invention is illustrated, for example, with reference to particular divisions of programs, functions and memories, the present invention should not be construed as limited to such logical divisions. Thus, the present invention should not be construed as limited to the configuration of FIG. 10 but is intended to encompass any configuration capable of carrying out the operations described herein.

The flowcharts and block diagrams of certain of the figures herein illustrate the architecture, functionality, and operation of possible implementations of selective implementation of single and dual clip closure means according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for supplying a clip to a clip window associated with a closure attachment mechanism adapted to allow a single clip or two clips to be controllably applied to a target tubular work piece in a closure zone in an automated manner, comprising:

automatically forcing a plurality of clips to travel in a first predetermined clip travel path having a forward direction toward a first punch path in a closure zone at a first point in time;

automatically, and forcibly retracting the plurality of clips so that the clips travel in a reverse direction along the first predetermined clip travel path away from the first punch path; and then automatically forcing the plurality of clips to again travel in the forward direction along the first predetermined clip travel path at a second point in time.

2. A method according to claim 1, further comprising:

automatically holding the plurality of clips above a first clip window associated with the first punch path in the closure zone for a desired interval after said retracting step and before said second forcing step, the interval associated with the number of target tubular workpieces that pass through the closure zone without receiving a clip from the first punch path; and automatically intermittently attaching a clip to selected tubular workpieces that pass through the closure zone using clips advanced along the first clip path to the first punch path during the forcing steps.

3. A method according to claim 2, further comprising:

repeatedly forcing a second plurality of clips to travel in a second predetermined clip travel path having a forward direction toward a second punch path with a second clip window;

automatically concurrently attaching one clip from the first clip punch path and one clip from the second clip punch path thereby selectively applying one clip to a greater number of target tubular workpieces and two clips to fewer numbers of target tubular workpieces as the tubular workpieces move through the closure zone.

4. A method according to claim 1, wherein the tubular workpieces are stuffed food product held in a casing material, said method further comprising advancing the tubular stuffed food product in a predetermined forward travel path and stalling the forward movement during the forcing steps.

5. A method according to claim 4, wherein the stuffed food products are meat products.

6. A method according to claim 1, further comprising reciprocating a first punch to travel along the first punch path during the forcing steps and the retracting step to selectively direct a clip positioned in the clip window to wrap about an end portion of one tubular product in the first clip window during the forcing steps.

7. A method according to claim 1, wherein the forcing steps comprise pushing the clips to travel in a generally downward direction, and wherein the retracting step comprises pulling the clips to travel in a generally upward direction.

8. A method according to claim 1, further comprising feeding a spool of attached clips to travel along a generally downwardly extending static rail with a lateral portion that defines the first predetermined travel path so that the forwardmost portion of the spool of clips enters a clip window to engage with a punch attachment mechanism in the first punch path.

9. A method according to claim 8, further comprising punching a clip in the clip window to force the clip to wrap around an underlying target workpiece.

10. A method according to claim 9, wherein the clips are metallic with a discontinuous perimeter having generally open end portions that when attached to the tubular work product sealably enclose spaced apart end portions of the tubular work product.

11. A method for supplying a clip to a clip window associated with a closure attachment mechanism adapted to allow a single clip or two clips to be controllably applied to a target tubular work piece in a closure zone in an automated manner, comprising:
   automatically forcing a plurality of clips to travel in a first predetermined clip travel path having a forward direction toward a first punch path in a closure zone at a first point in time;
   automatically retracting the plurality of clip so that the clips travel in a reverse direction along the first predetermined clip travel path away from the first punch path; and then
   automatically forcing the plurality of clip to again travel in the forward direction along the first predetermined clip travel path at a second point in time,
   wherein the forcing step at the second point in time is a second forcing step that comprises contacting an outer perimeter portion of at least one clip with a retraction member having a jaw with first and second opposing spaced apart hinge jaw members in communication with an extension spring configured to allow the hinged jaw member to open and close a desired distance to pull the clips in a generally upward direction away from a clip feed direction.

12. A method according to claim 11, wherein the first forcing step at the first point in time is a, first forcing step that contacting the outer perimeter of at least one of the plurality of clips with a pivotable pusher pawl and applying force in a generally forward direction to push the plurality of clips in the clip feed direction.

13. A method according to claim 12, wherein said retracting step comprises:
   disengaging the pusher pawl from the clips; and
   engaging the jaw members of the retraction member with a plurality of adjacent clips.

14. A method according to claim 13, wherein the clip has a central crown region that terminates into two opposing leg portions, and wherein the jaw members have a contact edge portion with a profile that corresponds to the outer profile of the legs of abutting clips.

15. A method according to claim 13, wherein said first and second forcing steps comprise:
   disengaging the jaw members of the retraction member from the clips; and
   engaging the pusher pawl with the clips.

16. A method according to claim 15, wherein the pusher pawl is disposed above the retraction member, said method further comprising rotating the pusher pawl upon contact with a stop anvil disposed above the pusher pawl to space the head away from the clips to thereby disengage the pusher pawl from the clips.

17. A method according to claim 12, wherein the pusher pawl is disposed above the retraction member.

18. A method according to claim 17, further comprising separating the retraction jaws a suitable distance to release the clips after the retracting step and before the second forcing step.

19. A method according to claim 18, wherein the opposing jaw members have legs with opposing top and bottom end portions, the top end portions being pivotably connected to the retraction mechanism and the bottom end portions defining the clip contact portion with the extension spring laterally extending therebetween.

20. A method according to claim 19, wherein the retraction member further comprises at least one jaw stop disposed above the retraction jaw members, the retraction jaw members each having an inner surface that faces the other, wherein, in operation, the jaw stop defines a cam surface and the jaw retraction member inner surfaces cooperate with the jaw stop cam surface to force the spaced apart legs to open and stretch the spring extending therebetween.

21. A method for controllably supplying a clip to a clip window associated with a closure attachment mechanism having a closure delivery path for allowing attachment of a single clip or two clips concurrently to a target tubular work piece in a closure zone, comprising:
   automatically pushing a plurality of clips to travel in a first predetermined clip travel path having a forward direction toward a first closure delivery path in a closure zone at a first point in time;
   automatically pulling the plurality of clips so that the clips travel in a reverse direction along the first predetermined clip travel path; and then
   automatically pushing the plurality of clips to again travel in the forward direction along the first predetermined clip travel path at a second point in time.

22. A method according to claim 21, further comprising automatically holding the plurality of clips above a first clip window associated with a punch path merging into the closure zone for a desired interval after said pulling step and before said pushing step at the second point in time, the interval associated with a desired number of target tubular workpieces that pass through the closure zone without receiving a clip from the punch path; and automatically intermittently attaching a clip to selected tubular workpieces that pass through the closure zone using clips advanced along the clip path to the punch path during the pushing steps.

23. A method according to claim 22, further comprising:
repeatedly forcing a second plurality of clips to travel in a second predetermined clip travel path having a forward direction toward a second punch path with a second clip window that is axially spaced apart from the first clip window;
automatically concurrently attaching one clip from the clip punch path and one clip from the second clip punch path thereby selectively applying one clip to a greater number of target tubular workpieces and two clips to fewer numbers of target tubular workpieces as the tubular workpieces move through the closure zone.

24. A method according to claim 22, wherein the tubular workpieces are stuffed food product held in a casing material, said method further composing advancing the tubular stuffed food product in a predetermined forward axial travel path and stalling the forward movement during the pushing steps.

25. A method according to claim 24, wherein the stuffed food products are meat products.

26. A method according to claim 21, wherein the pushing step at the second point in time is a second pushing step that comprises contacting an outer perimeter portion of at least one clip with a retraction member having a jaw with first and second opposing spaced apart hinged jaw members in communication with an extension spring configured to allow the hinged jaw members to open and close a desired distance to pull the dips in a generally upward direction away from a clip feed direction.

27. A method according to claim 26, wherein the pushing step at the first point in time is a first forcing step that comprises contacting the outer perimeter of at least one of the plurality of clips with a pivotable pusher pawl and applying force in a generally downward direction to push the plurality of clips in the clip feed direction.

28. A method according to claim 27, wherein said retracting step comprises:
disengaging the pusher pawl from the clips; and
engaging the jaw members of the retraction member with a plurality of adjacent clips.

29. A method according to claim 28, wherein the clip has a central crown region that terminates into two opposing leg portions, and wherein the jaw members have a contact edge portion with a profile that corresponds to the outer profile of the legs of abutting clips.

30. A method according to claim 28, wherein said pushing steps comprise:
disengaging the jaw members of the retraction member from the clips; and
engaging the pusher pawl with the clips.

* * * * *

UNITED STATES PATENT AND TRADEMARK OFFICE
CERTIFICATE OF CORRECTION

PATENT NO. : 6,920,738 B2
DATED : July 26, 2005
INVENTOR(S) : Wilkins et al.

It is certified that error appears in the above-identified patent and that said Letters Patent is hereby corrected as shown below:

Column 13,
Line 48, should read -- automatically retracting the plurality of clips so that the --.
Line 52, should read -- automatically retracting the plurality of clips to again travel --.
Line 59, should read -- spaced apart hinged jaw members in communication --.
Line 61, should read -- jaw members to open and close a desired distance to pull --.
Line 64, should read -- 12. A method according to claim 11, wherein the --.

Column 15,
Line 19, should read -- material, said method further comprising advancing the --.

Signed and Sealed this

Twenty-eighth Day of February, 2006

JON W. DUDAS
*Director of the United States Patent and Trademark Office*